No. 670,635. Patented Mar. 26, 1901.
B. HERNHUTER.
TIMING ATTACHMENT FOR CAMERAS.
(Application filed June 20, 1900.)
(No Model.)

Witnesses:
John Becker.
John Hickman.

Inventor
Bernhard Hernhuter
by his attorneys
Roeder & Briesen

THE NORRIS PETERS CO., PHOTO-LITHO., WASHINGTON, D. C.

UNITED STATES PATENT OFFICE.

BERNHARD HERNHUTER, OF NEW YORK, N. Y.

TIMING ATTACHMENT FOR CAMERAS.

SPECIFICATION forming part of Letters Patent No. 670,635, dated March 26, 1901.

Application filed June 20, 1900. Serial No. 20,917. (No model.)

*To all whom it may concern:*

Be it known that I, BERNHARD HERNHUTER, a citizen of Austria-Hungary, and a resident of New York city, county and State of New York, have invented certain new and useful Improvements in Photographic Cameras, of which the following is a specification.

This invention relates to a photographic camera for time exposures which is so constructed that the period of exposure is struck off in seconds by a clockwork which is automatically released when the shutter is opened. Thus the duration of the exposure may be controlled in a very simple and accurate manner without consulting a watch or without first setting the shutter to any previously-determined period of time.

Figure 1:
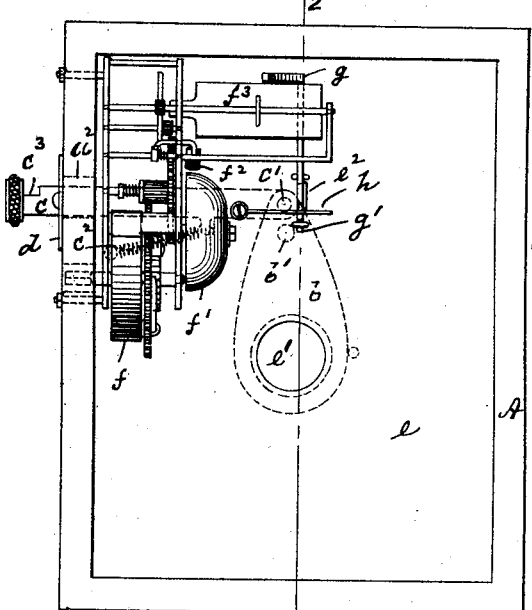
Figure 3:
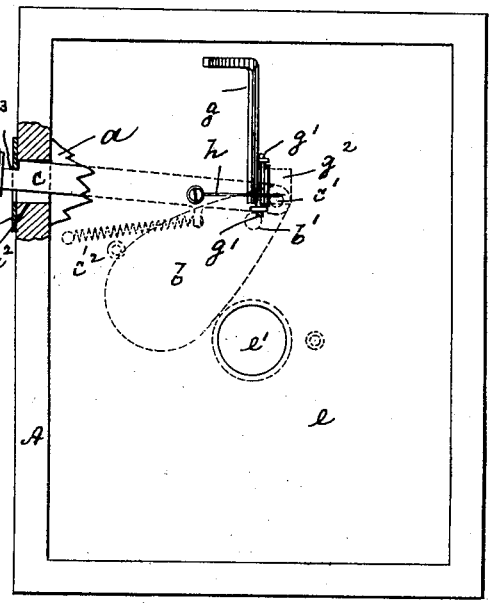
Figure 2:
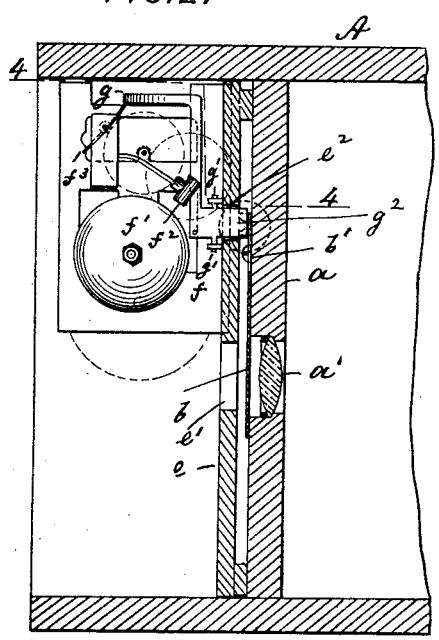
Figure 4:
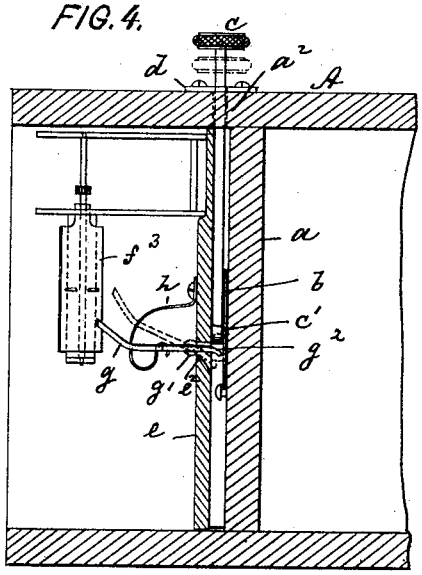

In the accompanying drawings, Figure 1 is a front view of a camera provided with my improvement, showing the shutter closed; Fig. 2, a vertical section on line 2 2, Fig. 1; Fig. 3, a front view, partly in section, with the clockwork removed and showing the shutter open; and Fig. 4, a horizontal section on line 4 4, Fig. 2, with the clockwork removed.

The letter $a$ represents the front of a camera A, having the objective lens $a'$, and $b$ is the shutter, pivoted to the front $a$ at $b'$. The shutter is operated by means of a push-rod $c$, pivoted to the shutter at $c'$ and influenced by a spring $c^2$, which tends to draw the rod outwardly and to thus close the shutter. The rod $c$ extends through a slot $a^2$ of the camera, which slot is of a width to permit a slight lateral play of the rod. By means of a notch $c^3$ on rod $c$, adapted to engage the edge of a face-plate $d$, the rod may be locked in its innermost position to hold the shutter open, Fig. 3. After the exposure has lasted for the time desired the rod $c$ is slightly depressed to become released from plate $d$, when the spring $c^2$ will draw the rod outwardly and close the shutter, Fig. 1.

The rod $c$, besides operating the shutter in the manner described, has the additional function of setting off an alarm that strikes off seconds while the shutter is open and is silenced when the shutter is closed, so that in this way the duration of the exposure may be accurately timed by the ear.

The mechanism for carrying this result into effect is as follows: In front of the plate $a$ there is secured to the camera a partition $e$, perforated at $e'$ in line with the lens $a'$. The partition $e$ carries a clockwork $f$, having a bell $f'$ and hammer $f^2$, which is adjusted to strike off equal periods of time, preferably seconds. The fly $f^3$ of the clockwork is adapted to be engaged and arrested by the front arm $g$ of a two-armed lever, which is pivoted to the partition $e$ at $g'$ and which is normally held against the fly by a spring $h$. The rear arm $g^2$ of the lever projects through a perforation $e^2$ of partition $e$ and is in the path of the push-rod $c$. When the rod $c$ is pushed inward to open the shutter, it will simultaneously tilt the lever $g$ $g^2$ and swing its arm $g$ backward to release fly $f^3$, as indicated by dotted lines, Fig. 4. The alarm will now promptly strike off the seconds, which may thus be easily counted to accurately control the time of exposure. When the alarm has struck off the number of seconds intended for the exposure, the rod $c$ is released, when the spring $c^2$ will draw it outward and close the shutter. At the same time the rod $c$ will release the lever-arm $g^2$, so that the lever-arm $g$ will be thrown against the fly $f^3$ by spring $h$ to arrest the clockwork, as indicated by full lines in Fig. 4. Thus it will be seen that the photographer can time the exposure with absolute accuracy without any setting of the apparatus and without being obliged to consult a watch.

What I claim is—

A photographic camera provided with a push-rod, a shutter and a lever operatively connected to the push-rod, an alarm, and a spring for throwing the lever against the alarm upon the withdrawal of the push-rod, substantially as specified.

Signed by me at New York city, county and State of New York, this 19th day of June, 1900.

BERNHARD HERNHUTER.

Witnesses:
F. V. BRIESEN,
WILLIAM SCHULZ.